United States Patent [19]
Bis

[11] 3,741,567
[45] June 26, 1973

[54] DEVICE FOR CENTERING DISC RECORDS ON THE TURNTABLE OF A RECORD PLAYER

[76] Inventor: Tadeck Valentin Bis, Les Landes, Saint Paul, Orne, France

[22] Filed: Oct. 27, 1971

[21] Appl. No.: 193,019

[30] Foreign Application Priority Data

Nov. 2, 1970 France .............................. 7039409

[52] U.S. Cl. ................................................ 274/10 S
[51] Int. Cl. ............................................ G11b 17/04
[58] Field of Search........................... 274/10 S, 38 R

[56] References Cited

UNITED STATES PATENTS

| | | | |
|---|---|---|---|
| 2,693,364 | 11/1954 | Chalfin | 274/10 S |
| 2,762,627 | 9/1956 | Johnson | 274/10 S |

FOREIGN PATENTS OR APPLICATIONS

| | | | |
|---|---|---|---|
| 1,251,050 | 9/1967 | Germany | 274/39 R |

*Primary Examiner*—Harry N. Haroian
*Attorney*—Frank R. Trifari

[57] ABSTRACT

A device for centering disc records on a record player having a centering and ejection element which accommodates records having larger center holes and is displaceable over the central spindle which accommodates records with small center holes. The centering element is arranged to be recessed in the turntable against the force of a spring. Projections are provided for locking the centering element in the recessed position. The centering element can be unlocked by exerting pressure on it, with the result that the centering element is clamped around a ring movable over the spindle and is resiliently widened, so that during its return it is capable of passing over a collar on the central spindle, and the ring is arrested by this collar.

4 Claims, 2 Drawing Figures

PATENTED JUN 26 1973 3,741,567

Figure 1:
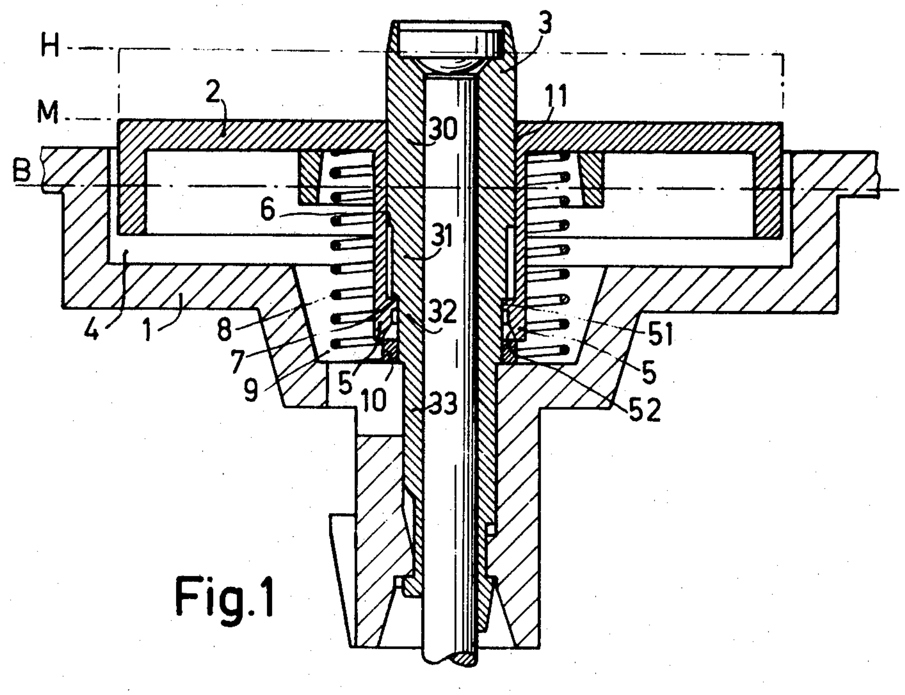

INVENTOR.
TADECK VALENTIN BIS
BY
Frank Tifani
AGENT

DEVICE FOR CENTERING DISC RECORDS ON THE TURNTABLE OF A RECORD PLAYER

The invention relates generally to a device for centering disc records on the turntable of a record player, particularly, the device comprises a cylindrical centering element which is provided with a radially resilient sleeve portion displaceable along a central spindle and is arranged to be sunk into a recess in the turntable against spring action. The sleeve portion of the centering element is internally provided with radially projecting locking members which in conjunction with locking members on the central spindle lock the cylindrical element in its sunk condition.

A device of this kind is described in German Patent specification No. 1,251,050. In this known device the central spindle is movable in the direction of its length along a central stud secured in the turntable, the locking members of the central spindle, which in the sunk condition of the centering element cooperate with the locking members of this element, being in the form of a circumferential groove. In order to unlock the centering element from the sunk locked condition the central spindle is depressed to the bottom of the recess in the turntable, so that the spring force acting on the centering element is increased to a value such that the locking members of the centering element snap out of the groove in the central spindle. This known device in which the central spindle is movable relative to the turntable has the disadvantage that the turntable and a disc record placed on it may be displaced relative to one another, which may cause damage to the record.

It is an object of the present invention to obviate the said disadvantage and a device according to the invention is characterized in that the central spindle is secured in the turntable and comprises at least two cylindrical portions the diameters of which are smaller than the diameter of the central spindle and which are separated from one another by a boundary region with which, in the sunk condition of the centering element, the locking members of this element cooperate. A disconnecting ring is provided and is movable over the cylindrical portion more remote from the central spindle, the outer diameter of which is at least equal to the greatest diameter of the boundary region. When the centering element is further depressed from the locked sunk condition its sleeve part is capable of gripping around the disconnecting ring and, when the depressing force is then removed, carries along this ring until it abuts the boundary region so as to terminate the locking between the centering element and the spindle.

The present invention provides a centering device which, though simple, functions safely and reliably.

It should be noted that German Patent specification No. 1,251,050 describes an embodiment of a centering device in which the centering element is movable over a central spindle which is rigidly secured in the turntable. In this embodiment the centering element is provided with an external radially projecting rounded collar which in the sunk condition of the element cooperates with a radially inwardly projecting rounded collar of the recess in the turntable. Only the spring force acting on the centering element is available to disconnect it and this force must be capable of overcoming the friction produced between the locking members of the centering element and the recess in the turntable. The spring force and the frictional force must be in an accurately specified relationship, but after frequent use of the device this relationship will not be maintained, with consequent unreliable operation of the device.

A suitable embodiment of the invention consists in that the diameters of the two cylindrical portions of the central spindle are different from one another, the portion having the smaller diameter being that portion which is more remote from the central spindle, whilst the boundary region between these portions is formed by a shoulder-shaped junction between these portions.

Another suitable embodiment of the invention consists in that the diameters of the two cylindrical portions of the central spindle are equal and the boundary region between these portions is formed by an annular collar, the surface of the collar adjacent to the cylindrical portion more remote from the central spindle lying in a plane at right angles to the spindle, whilst the surface of the collar adjacent to the other cylindrical portion forms part of a conical surface.

According to the invention a tapering bore is preferably formed in that sleeve part of the centering element which cooperates with the disconnecting ring.

Figure 2:
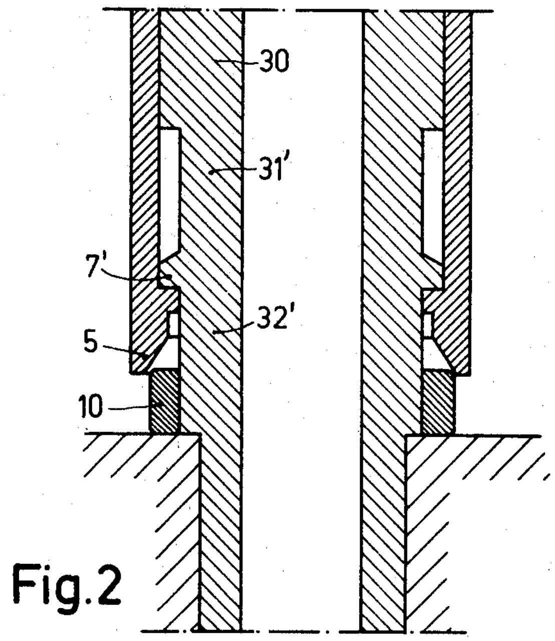

Embodiments of the invention will now be described, by way of example, with reference to the accompanying diagrammatic drawings, in which:

FIG. 1 is a part perspective view, part sectional view of an embodiment of a centering device according to the invention, and FIG. 2 shows a detail of a modified embodiment of a device according to the invention.

Referring now to the Figures, a central spindle 3 for carrying disc records provided with a small centre hole is secured in a turntable 1. The central portion of the turntable is provided with two recesses 4 and 9. The recess 4, which is cylindrical, has a diameter which is greater than the diameter of a cylindrical element 2 which serves as a centering element for disc records having a large centre hole, whilst the second recess 9 forms a coaxial extension of the recess 4 in the form of a truncated cone.

The centering element 2 comprises a sleeve 11 the bore of which is equal to the diameter of the central spindle 3 and which terminates in a portion 5 provided with a tapering bore 52. The sleeve portion of the centering element is movable over the central spindle 3, which spindle in the embodiment shown in FIG. 1 comprises the following cylindrical portions of different diameters: the centering portion 30 proper having an outer diameter equal to the diameter of the small centre holes of disc-records, a first cylindrical portion 31 having a smaller outer diameter and a second cylindrical portion 32 having a diameter even smaller than the diameter of the portion 31. The turntable 1 is secured to the portion 33 of the central spindle.

The end 5 of the sleeve portion of the centering element is resilient, for example in that it is provided with longitudinal sawcuts (not shown). This resilience enables the sleeve to form a clamping member capable of cooperating with shoulders 6 and 7 which form the boundaries between the portions 30, 31 and 32 of the central spindle. The sleeve 5 is provided with a radially inwardly projecting collar 51 the purpose of which will be described hereinafter.

In the recess 9 of the turntable there is disposed a ring 10 which is slidable on the cylindrical portion 32 of the central spindle. The inner diameter of the ring 10 is at least equal to the outer diameter of the portion 32, whilst the outer diameter of the ring is at least equal to that of the cylindrical portion 31. The height of the ring is smaller than the length of the cylindrical portion 32, which also enables the end portion 5 of the sleeve 11 to be located in the region of the cylindrical portion 32 without the conical bore 52 of the sleeve portion 5 contacting the ring 10.

A helically coiled spring 8 rests on the bottom of the recess 9 and exerts a thrust force on the centering element 2.

In the modified embodiment shown in FIG. 2 cylindrical shaft portions 31' and 32' have equal outer diameters which are smaller than the outer diameter of the central spindle 30. The boundary region between these portions is formed by an annular collar 7', the surface of the collar adjacent to the cylindrical portion 32' lying in a plane at right angles to the spindle, whilst the surface of the collar adjacent to the other cylindrical portion 31' forms part of a conical surface. In this embodiment the outer diameter of the ring 10 must at least be equal to the outer diameter of the collar 7'.

In the two aforedescribed embodiments the lengths of the various cylindrical portions of the spindle are determined as functions of the positions relative to the turntable which the centering element is to occupy.

The operation of the device according to the invention is as follows.

When the centering element 2 is in its uppermost position H, in which position disc records having large centre holes can be centered, the force of the spring 8 causes the collar 51 of the centering element to bear against the shoulder 6 located at the junction between the centering portion 30 proper and the adjacent smaller- diameter portion 31. For playing records having small centre holes the centering element 2 is depressed, the collar 51 of the sleeve part 11 sliding over the cylindrical portion 31 until it reaches the cylindrical portion 32. When the upper surface of the centering element is substantially flush with the upper surface of the turntable, i.e. when the centering element 2 has reached the position M, the collar 51 is located opposite the portion 32 of the central spindle. When the thrust force is removed, the spring 8 will cause the collar 51 to bear against the shoulder 7 at the junction between the portions 31 and 32.

To unlock the centering element and to return it to its uppermost position H the centering element is depressed into a position B. The end of the sleeve portion 5 is pressed with its conical bore 52 against the disconnecting ring 10 and clamped around its circumference. The ring penetrates into the sleeve portion 5 until the instant at which the end of the sleeve 5 strikes the bottom of the recess 9.

When the thrust force is removed, the ring together with the centering element is raised under the influence of the force of the spring 8, the collar 51 of the centering element now being capable to pass over the shoulder 7 and the collar 7' respectively. The ring then strikes the shoulder 7 or the collar 7' so that it is pushed out of the bore 52 of the sleeve part 5. The ring 10 slides back over the spindle portion 32 to the bottom of the recess 9, whilst the centering element continues its upward movement until the collar 51 strikes the shoulder 6 of the central spindle, in which condition the centering element 2 has returned to its uppermost position H.

The centering device according to the invention may advantageously be used as an ejection device by means of which foil-like disc records may readily be removed from the turntable after having been played. During the playing of such very thin and flexible disc records the centering element is in the sunk locked position M. When such a record after having been played it is to be removed from the turntable, one has only to expert pressure on the central part of the record, i.e. the area at which the label is located, with the result that in the aforedescribed manner the centering element moves via the position B to the position H, the foil-like record being lifted from the turntable, permitting it to be readily removed.

What is claimed is:

1. A device for centering disc records on the turntable of a record player comprising a central spindle secured in said turntable having first, second and third cylindrical portions, the diameter of said first and second portions being smaller than the diameter of said third portion, a boundary separating said first cylindrical portion from said second cylindrical portion, a cylindrical centering element having a radially resilient sleeve portion and arranged for axial displacement along said central spindle between a raised, a recessed, and a depressed position, a recess within said turntable for receiving said centering element when in the recessed and depressed positions, spring means acting on said centering element for urging said centering element toward said raised position, radially projecting locking members internally carried by said sleeve portion of said centering element for cooperation with said boundary between said first and second cylindrical portions of said central spindle so as to lock said centering element in its recessed position, a disconnect ring movable over said first cylindrical portion having an outer diameter at least equal to the largest diameter of said boundary, gripping means arranged on the lower part of said sleeve for gripping said disconnect ring when a force is applied to said centering element to move it to said depressed position and for carrying said ring toward said raised position of said centering element when said force is removed until said ring abuts said boundary thereby unlocking said centering element from the recessed position.

2. The device according to claim 1 wherein said first cylindrical portion of said central spindle has a smaller diameter than the second cylindrical portion of said central spindle, said second cylindrical portion being axially located in between said first and third cylindrical portion, and wherein said boundary between said first and second cylindrical portions comprises a shoulder shaped junction.

3. The device according to claim 1 wherein said first and second cylindrical portions of said central spindle have equal diameters, said second cylindrical portion being axially located in between said first and third cylindrical portions of said central spindle, and wherein said boundary between said first and second cylindrical portions comprises an annular collar, the surface of said collar adjacent said first cylindrical portion lying in a plane at right angles to said first cylindrical portion, and the surface of said collar adjacent said second cylindrical portion forming part of a conical surface.

4. The device according to claim 1 wherein said gripping means comprises a tapered bore formed in the part of said sleeve of said centering element arranged for cooperation with said disconnect ring.

* * * * *